(No Model.)
J. M. FALLIS.
POTATO DIGGER.
No. 463,661. Patented Nov. 24, 1891.
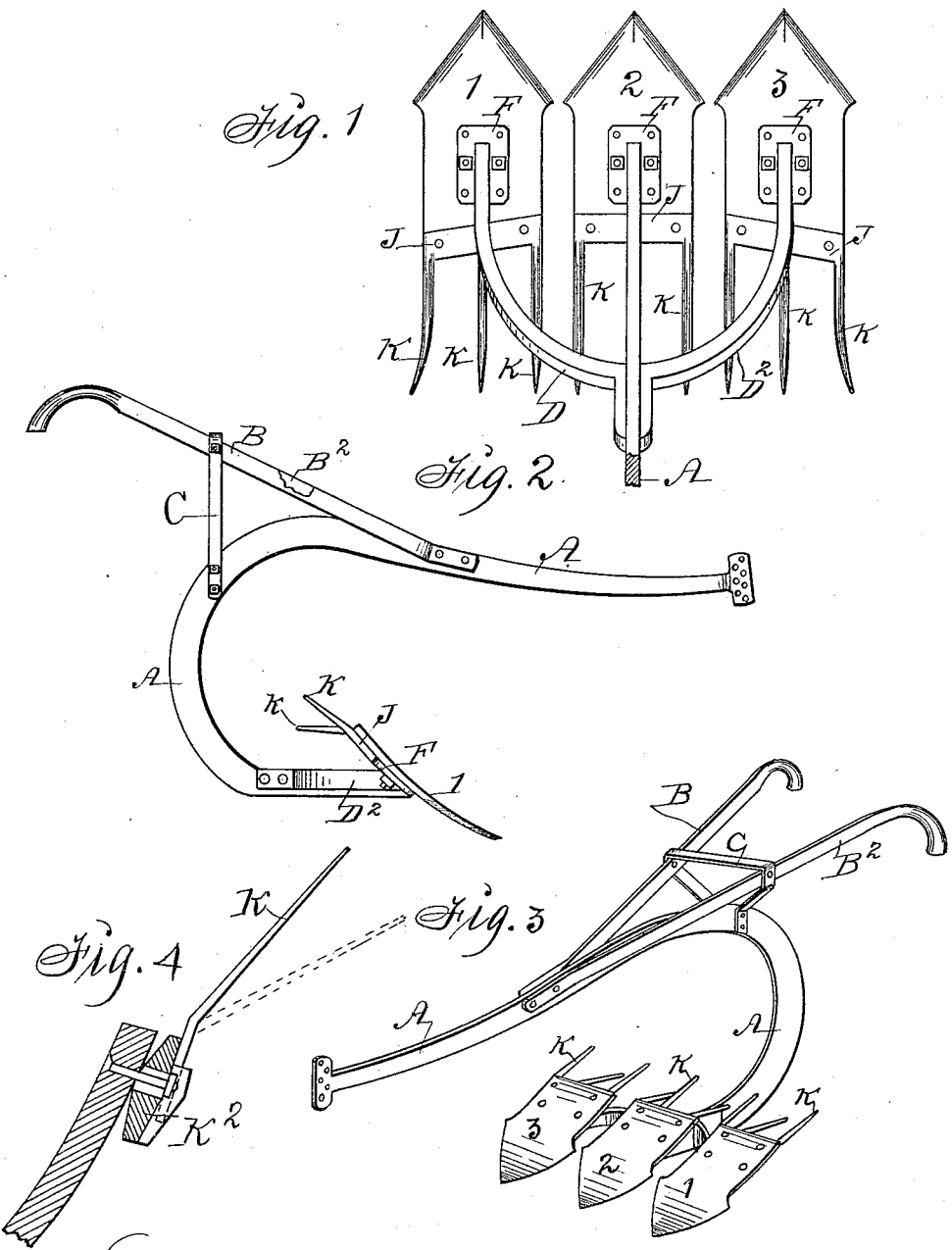
Witnesses:
R. H. Orwig
M. Smith
Inventor:
John M. Fallis
By Thomas G. Orwig, Atty.

UNITED STATES PATENT OFFICE.

JOHN M. FALLIS, OF INDIANOLA, IOWA.

POTATO-DIGGER.

SPECIFICATION forming part of Letters Patent No. 463,661, dated November 24, 1891.

Application filed June 16, 1891. Serial No. 396,417. (No model.)

*To all whom it may concern:*

Be it known that I, JOHN M. FALLIS, a citizen of the United States of America, residing at Indianola, in the county of Warren and State of Iowa, have invented a new and useful Potato-Digger, of which the following is a specification.

My object is to facilitate the removal of potatoes from the ground; and my invention consists in the construction and operation of a multiple plow, as hereinafter set forth, pointed out in my claims, and illustrated in the accompanying drawings, in which—

Figure 1 is a detail bottom view of the plows and a portion of the frame of my machine. Fig. 2 is a side view, and Fig. 3 is a perspective view, of the complete machine, showing the relative positions of all its operative parts. Fig. 4 is a detail view showing prongs adjustably connected with the top of a plow.

A is a curved plow-beam of common form, having a series of perforations at its enlarged front end, to which a clevis may be adjustably attached.

B and $B^2$ are handles of common form fixed to the top portion of the beam A at their front ends.

C is a brace formed complete in one piece and fitted at its ends to the beam A and at its central portions to each of the handles to support and strengthen them.

D and $D^2$ are curved arms fixed to the lower portion of the beam A on its opposite sides to project laterally in opposite directions and in the same plane therewith. Bearings F are formed integral with the projecting lower ends of the beam A and the arms D and $D^2$ and perforated in parallel rows to admit rivets or bolts to adjustably attach the shovels or plows thereto, as clearly shown in Fig. 1.

Numbers 1 2 3 are plows or shovels of common form made of flat metal and slightly concaved on their outer faces. They are pointed at their lower end and their inclined sharp edges produce a zigzag or sickle-shaped cutter across the bottom of the complete plow, and the spaces between them allow loose ground to pass through rearward as the plow is advanced in the field. A metal plate fixed to the back and top of each shovel has projecting metal prongs K formed integral therewith. Said prongs are alternately depressed and elevated, as clearly shown in Figs. 2 and 3, to facilitate the passage of the matter elevated by the plows and to separate the potatoes from the ground lifted therewith.

In the practical operation of my invention I direct the shovels beneath the row of potatoes which I desire to remove, and the ground and potatoes come up the inclined planes of the shovels and pass against the prongs. The broken soil readily passes between the prongs, but the potatoes are forced over the tops thereof and deposited upon the ground in the rear of the machine, and can then be readily picked up in a common way.

By means of my multiple plow the ground and potatoes are more easily lifted and separated without cutting and bruising the potatoes, and consequently less power and labor is required to gather a crop, and the potatoes will be cleaner and in a better condition for preservation than when a single plow is used, and the entire force of its broad face is pressed against the potatoes and ground as it is advanced to lift and spread the ground and potatoes in its line of advance.

By fixing the prongs K to a cross-bar $K^2$, as shown in Fig. 4, and beveling the back of the bar and making enlarged perforations therein, the bar can be clamped fast to the back and top of a plow by means of screw-bolt and nut and adjusted so as to raise or lower the ends of the prongs K to adapt them for wet or dry ground, and, as required, to facilitate the separation of potatoes from the ground.

I claim as my invention—

1. A potato-digger comprising a beam that is curved downward at its rear end, handles fixed to the horizontal portion of the beam to project rearward, arms fixed to the lower end portion of the beam bent outward and terminating in line with the extremity of the lower end of the beam, and shovels having prongs projecting upward from their tops connected to the free ends of the said arms and the end of the beam, to operate in the manner set forth.

2. A potato-digger consisting of a beam A, handles B and $B^2$, a brace C, projecting elbow-shaped arms D and $D^2$, bearings F, shovels 1, 2, and 3, prongs K, and plates $K^2$, arranged and combined as shown and described, for the purposes stated.

JOHN M. FALLIS.

Witnesses:
G. W. FRAZER,
I. F. HEADRICK.